INVENTOR:
KIYOSHI INOUE
BY Karl F. Ross
AGENT.

INVENTOR:
KIYOSHI INOUI

BY Karl F. Ross

AGENT.

United States Patent Office 3,305,331
Patented Feb. 21, 1967

3,305,331
METHOD OF MAKING DIAMOND-FACED
ARTICLES
Kiyoshi Inoue, 182 3-chome, Tamagawayoga-machi,
Tokyo-to, Japan
Original application Feb. 28, 1961, Ser. No. 92,284, now
Patent No. 3,207,582, dated Sept. 21, 1965. Divided
and this application June 16, 1965, Ser. No. 490,756
Claims priority, application Japan, Mar. 3, 1960,
35/6,569
7 Claims. (Cl. 51—307)

This application is a division of application Ser. No. 92,284, filed February 28, 1961, now U.S. Pat. No. 3,207,582 of September 21, 1965.

The present invention relates to a method of synthesizing diamond particles from amorphous carbon or graphite, and more particularly to a method of directly synthesizing diamond particles from amorphous carbon or graphite by utilizing the high temperatures and impulsive high pressures produced by an electric discharge.

Although it is well known that diamond, graphite and amorphous carbon all consist of the same element, i.e., carbon, they are considerably different in appearance, as well as with respect to their physical and chemical properties due to their different crystalline structure. Diamonds are widely used as cutting tool tips for machine tools, wire drawing dies or ornaments, because they have the highest hardness value of all substances and because it is possible to impart to them a special luster by grinding and polishing. Natural production of diamond is limited, and methods of artificially producing diamonds, in a convenient and effective manner, had not hitherto been developed. On the other hand, amorphous carbon and graphite constituted also of elemental carbon as pointed out above are produced naturally in large quantities and it would be quite natural to consider that diamonds could be artificially synthesized by subjecting amorphous carbon or graphite to definite physical and chemical conditions to alter their crystalline structures.

While there has not yet been any definite determination as to what the physical and chemical conditions necessary in order to alter the crystalline structure of carbonaceous material for obtaining the so-called "diamond crystalline lattice," it has been presumed that a high temperature of over about 4000° C. and a high pressure of over about 200 tons per square centimeter would be necessary. As a result of extensive experiments, I have found that above mentioned conditions of high temperature and high pressure can be produced under certain conditions by spark discharges between electrodes and I have succeeded in synthesizing diamond particles from graphite or amorphous carbon.

More particularly, I have produced minute particles of diamond according to a method which comprises disposing a pair of electrodes made of graphite to define a minute gap therebetween in a liquid having predominant properties of dielectrics (if required, it may be an electric conductive liquid or electrolyte), and producing an electric discharge across the graphite electrodes to yield the particles. Upon examining the minute particles having a specific gravity of about 3.5 with X-ray analyzing devices, I have ascertained a line of 3.56 A. representative of the lattice constant of the diamond. Scratch tests were also made wherein these minute particles were tested on a mirror finished tungsten carbide plate and I have found that the abrasive property of the particles seems to be higher than that of the natural diamond. Thus I believe that I have succeeded in the synthesis of diamond particles having hardness sufficiently larger than such extremely hard materials as tungsten carbide.

My experiments also revealed that colored diamonds could be obtained by disposing a pigmenting substance near the graphite electrodes at the time of producing the electric discharge therebetween.

According to my method of synthesis, electric discharge is produced in a liquid to subject graphite used as the electrodes to an extremely high temperature and high pressure (impulsive pressure caused by electric discharge) condition, whereby it is possible to directly and easily synthesize diamond particles from graphite. Thus, it is possible to produce grinding discs which, heretofore, have been termed diamond wheels, by producing electric discharges on the surface of a graphite disc or of a disc which is prepared by sintering a mixture of particles of iron, nickel, chromium and graphite and maintained in a working liquid, whereby to transform the graphite particles contained in the disc surface into diamond particles. It is also possible to produce diamond needles by applying a layer of minute particles of carbon or graphite on the surface of a needle for use with phonograph records and thereafter producing a spark electric discharge on said surface of said needle maintained in the liquid. The diamond wheels and diamond needles (styli) are only examples of the products produced by my method of synthesizing diamond particles, and I believe that this invention can be equally applied to many other applications.

An object of this invention is to provide a novel method of producing tools and other articles having surfaces of very high abrasive property by forming thereon (in situ) diamond particles which are synthesized from graphite or amorphous carbon by utilizing an electric discharge.

Further objects of this invention will become apparent from the following detailed description of my improved method of synthesis with reference to the accompanying drawings, in which the same or equivalent members are designated by the same reference numerals and in which.

Figure 4:
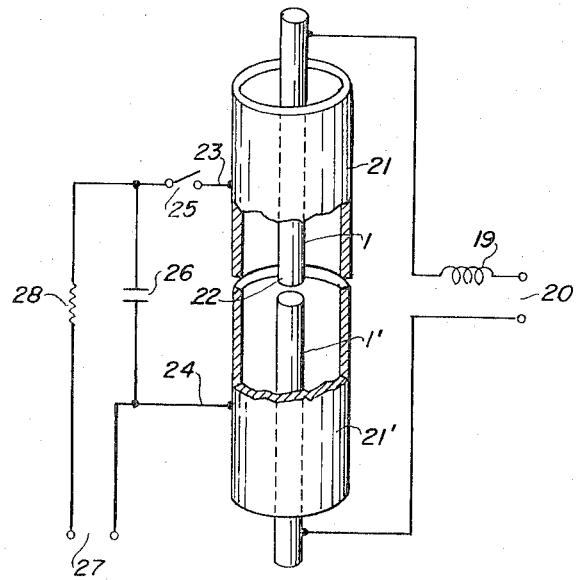
Figure 5:
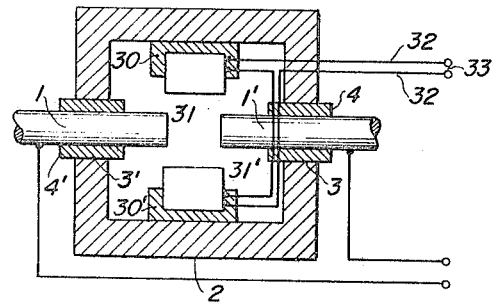
Figure 7:
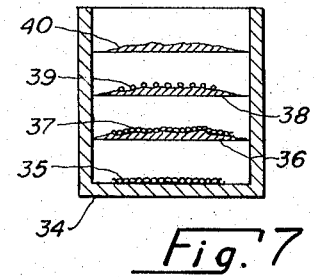
Figure 9:
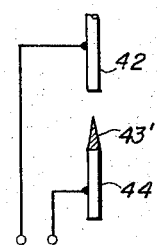

FIGS. 3a to 3g inclusive illustrate another improved construction of the electrodes for preventing damage thereof or for coloring the diamond particles synthesized;

FIG. 4 shows a modified apparatus adapted to concentrate the high temperature and high pressure produced by the electric discharge, thus increasing their function;

FIG. 5 shows an improved apparatus for increasing the high temperature and high pressure still further at the discharge site;

FIGS. 6a, 6b and 6c are diagrams for explaining an improved method of separating diamond particles contained in the working liquid;

FIG. 7 is a diagram for explaining a single step separating method;

FIGS. 8a and 8b are diagrammatic views for explaining the method of producing a diamond wheel according to my invention; and FIG. 9 is a diagrammatic view for explaining a method of producing a diamond needle in accordance with my invention.

Figure 1:
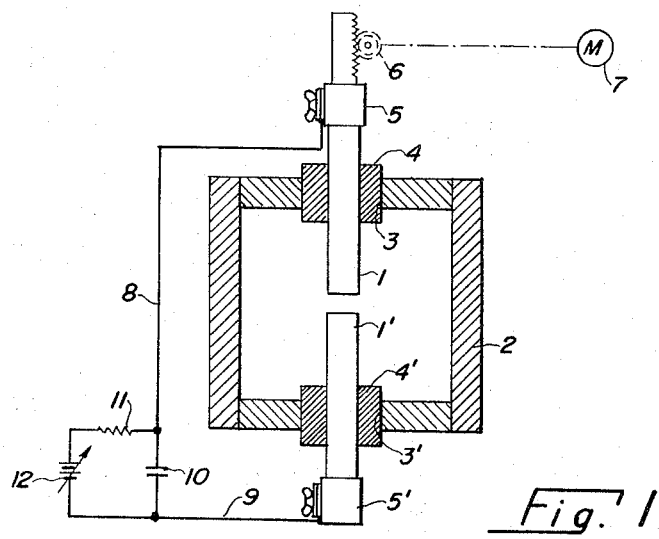
FIG. 1 is a diagrammatic representation of essential portions of an apparatus for carrying out my improved method of synthesizing diamond particles from graphite.

Referring now to FIG. 1 of the accompanying drawing, reference numerals 1 and 1' represent electrodes made of amorphous carbon or graphite and disposed to oppose each other with a small discharge gap therebetween. An electric discharge tank 2 is filled with a dielectric liquid. At the upper and lower portions of the discharge tank 2, there are perforations 3 and 3' adapted to receive electrodes 1 and 1', respectively, the space between the electrodes and the perforations 3 and 3' being hermetically sealed by spacers 4 and 4'. The electrode 1 is held at the outside of the discharge tank 2 by means of an electrode chuck 5 having a rack and pinion device 6 at its upper portion. The rack and pinion device 6 is driven by a motor 7 for advancing the electrode 1 into the discharge tank 2. Thus, the length of the discharge gap is adjustable to establish the discharge-initiating voltage, to start discharge and to compensate electrode consumption. Similarly, the electrode 1' is held by chuck 5' at the outside of the discharge tank 2, and lead wires 8 and 9 are respectively connected to electrodes 1 and 1'. The lead wires are connected across the terminals of a discharge condenser 10, which, in turn, is connected with a direct-current charging source 12 through a stabilizing impedance 11.

With this device, if the voltage across the discharge gap between the electrodes 1 and 1' reaches the critical discharge value, the electric charge stored in the condenser 10 will be discharged through the gap between the electrodes 1 and 1'. Since the terminal voltage of said discharge condenser 10 is decreased due to said discharge, said terminal voltage is prevented from rebuilding rapidly by the action of the stabilizing impedance 11 so that the discharge across said electrodes would stop immediately and there is no tendency to form a continuous arc, but intermittent spark discharge is permitted. Thus, when the discharge is terminated, the terminal voltage of the discharge condenser 10 will begin to increase again until the discharge gap will again break down. In this way, the electrodes 1 and 1' will repeatedly discharge and the impulsive pressure and high pressure created by the spark discharge will cause the amorphous carbon or graphite constituting the electrodes to melt and disperse it, as small particles, into the surrounding liquid. Carbon particles thus dispersed in the liquid will be fused by high temperature of the electric discharge and then converted into diamonds under the influence of impulsive force of the discharge while they are cooled in the liquid. Thus, it is evident that all physical and chemical conditions necessary for the synthesis of diamonds are fulfilled in the spark discharge between the electrodes immersed in a liquid.

Since due to the repeated spark discharge both the electrodes 1 and 1' will be gradually consumed to increase the discharge gap therebetween, the driving motor 7 is arranged so as to be controlled in accordance with a quantity related to the discharge current to lower the electrode 1 towards the electrode 1' through the rack and pinion device 6, to maintain a constant gap width.

According to my experiments, when a discharge energy of 5000 joules was discharged between the electrodes to disperse minute particles of electrode material, I have ascertained production of minute diamond particles in said dispersed particles was confirmed from the result of X-ray diffraction test and scratch test made on a mirror-finished tungsten carbide plate.

In this regard, I have found that yield of diamond particles could be increased by causing a high energy discharge between electrodes after the pressure in the discharge tank 2 has been increased by vaporization of the liquid and expansion thereof with temperature increase caused by initial several discharges. Also, with the device shown in FIG. 1, it is necessary to take care that the discharge formed across the electrodes 1 and 1' does not degenerate to an arc discharge. Thus, although arc discharge causes the electrodes 1 and 1' to be heated to a very high temperature due to the heat generated thereby, since the discharge is continuous, it is impossible to obtain the necessary impulsive pressure. On the contrary, by using a spark discharge the requisite impulsive pressure can be obtained.

According to the result of my experiment which was made by using the device shown in FIG. 1, it was found that better results were obtained when the voltage of the discharging direct current source 12 was low and the capacitance of the discharge capacitor 10 larger than in the case wherein the voltage of the source is high and the capacitance of the condenser is small, assuming that the energy of discharge is the same for both cases, although the reason for this is not well understood.

In order to increase the impulsive pressure which is generated by the spark discharge and acts upon the discharging points, it is advantageous to use a liquid which volatilizes easily, has a large volumetric expansion coefficient and is non-compressible. It is believed that explosive mechanical force which is created simultaneously with the spark discharge is also effective. According to my experiments, kerosene, carbon tetrachloride and the like are preferable liquids to give good results.

It was also confirmed that the diameter of the diamond particles could be increased when solutions of hydrocarbons are used and I think that this is due to the fact that such solutions as described above have a function of promoting the growth of the diamond particles when they are synthesized. Although it is not yet clearly understood why hydrocarbon solutions promote the growth of diamond particles, I presume that the carbon elemental freed by the decomposition of the hydrocarbon at the high temperature of the spark discharge participates with the melted carbon of the electrode. According to my experiments, diamond particles having maximum diameter of about $14\mu\phi$ were produced when kerosene oil (a hydrocarbon compound) and a discharge energy of 5000 joules were used, whereas particles of maximum diameter of $16\mu\phi$ were obtained with the same discharge energy when a solution of hydrocarbon corresponding to $C_{12}H_{22}O_{11}+H_2O$ was used.

Figure 2:
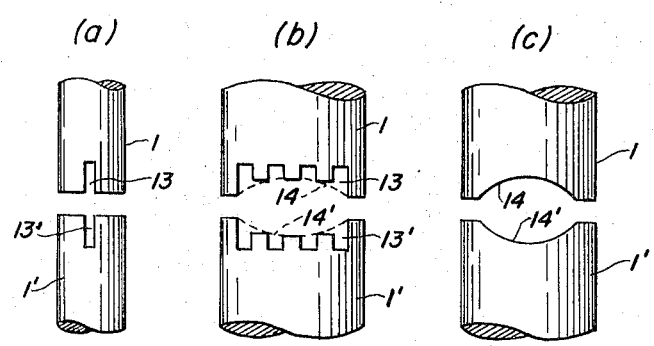
FIGS. 2a, 2b and 2c are diagrammatic elevational views showing the construction of improved electrodes for increasing the effective impulsive pressure of an electric spark discharge.

FIGS. 2a, 2b, and 2c show various constructions of electrodes for increasing the impulsive pressure produced by the spark discharge. In FIG. 2a, slots 13 and 13' are provided near the center of the electrodes 1 and 1', in FIG. 2b the opposing surfaces of the electrodes are provided with concave portions 14 and 14', respectively, together with several longitudinal slots 13 and 13'; in FIG. 2c, concave portions 14 and 14' are provided at the central portion of the electrodes 1 and 1'.

By providing the slots 13 and 13' and/or the concave portions 14 and 14' for the electrodes 1 and 1', as shown in the drawing, the impulsive pressure created by the spark discharge will act convergently upon the slots or concave portions to impart a large impulsive pressure to the melted portion of the electrodes.

It was found that the construction of the electrodes as shown in FIG. 2b is better than that shown in FIG. 2c. It is believed that this is mainly due to concentration of the discharge energy at a minute area of the projecting portions of the electrodes of FIG. 2b, because discharge points have a tendency to be formed thereon.

When diamond particles are synthesized by forming spark discharge in the device shown in FIG. 1, portions of the electrodes 1 and 1' which are not yet melted by the electric discharge have a tendency to be disintegrated by the impulsive pressure due to discharge. It is necessary to reinforce the electrodes 1 and 1' so as to concentrate the impulsive pressure to the discharge points alone and to make it possible to cause repeated discharge at these points.

Figure 3:
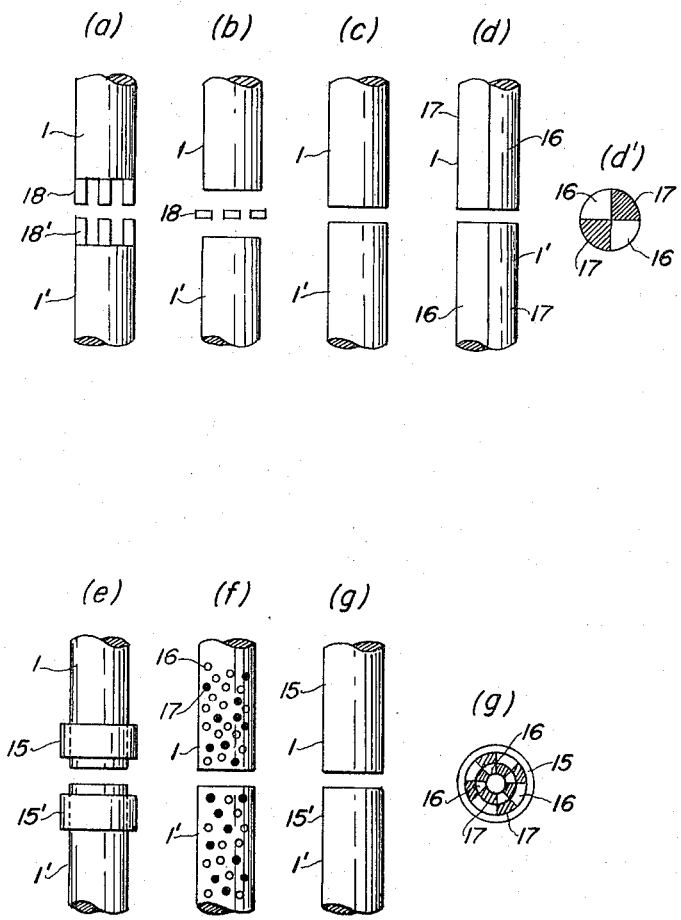

FIGS. 3e and 3g show constructions of electrodes 1 and 1' having reinforcing means, which, in the case of FIG. 3e, comprises metallic rings 15 and 15' surrounding the electrodes 1 and 1', respectively.

FIG. 3g shows another construction of the reinforced electrodes 1 and 1', each comprising alternately sections 17 of amorphous carbon or graphite and reinforcing sections 16 of a metal which are clamped together by reinforcing metal cylinders 15 and 15', tightly fitting around them. Thus, only the discharge points which are heated to molten states by the heat of the spark discharge are gradually separated and high temperature molten carbon particles of high temperature will be transformed into diamond particles under the action of the impulsive high pressure imparted thereto.

By experiments I have found that, if amorphous carbon or graphite were placed near the spark discharge points together with titanium oxide, simultaneously with the transformation of carbon particles into diamond particles caused by the high temperature and high pressure of the spark discharge, titanium oxide is included in the diamond particles, thus providing pink or colored diamond particles.

FIG. 3a shows a construction of the electrodes wherein the body of the electrodes 1 and 1' is made of titanium oxide and particles 18 and 18' of amorphous carbon or graphite are attached to the tip of the electrodes, or conversely the body of the electrode 1 and 1' is made of amorphous carbon or graphite and titanium oxide particles 18 and 18' are attached to the tip of the electrodes.

Similarly, FIG. 3b shows an electrode construction wherein the electrodes 1 and 1' are composed of titanium oxide or graphite and intermediate electrodes 18 made of graphite or titanium oxide are used. In this figure, the intermediate electrodes 18 are disposed adjacent the discharge gap between the main electrodes 1 and 1' and supported by flexible means, with respect to the main electrodes 1 and 1'; but it is not always necessary to electrically connect said intermediate electrode to the main electrodes.

In FIG. 3c, one electrode 1 is composed of amorphous carbon or graphite while the other electrode 1' is composed of titanium oxide. FIG. 3d shows an electrode construction wherein both the electrodes 1 and 1' are composed of amorphous carbon or graphite 17 and of titanium oxide 16 which are disposed as shown in FIG. 3d'.

FIG. 3e shows an electrode construction wherein reinforcing metal rings 15 and 15' are fit around the electrodes 1 and 1' made of graphite, as already explained hereinbefore, but when it is desired to synthesize colored diamond particles, titanium oxide is used as said reinforcing metal ring 15 and 15'. This construction not only provides a coloring effect upon diamond particles, but also reinforces them.

FIG. 3f shows another electrode construction on formed by sintering together particles 16 of amorphous carbon or graphite and titanium oxide particles 17.

FIGS. 3g and 3g' show still another electrode construction wherein reinforcing metal sections 16 and amorphous carbon or graphite sections are alternately disposed; these sections are surrounded with reinforcing metal rings 15 and 15' made of titanium oxide, said metal rings causing reinforcing function of the electrodes as well as the diamond coloring function just like the construction shown in FIG. 3e. While these electrodes are not provided with the reinforcing metal rings, if necessary they can be provided with such reinforcing metal rings 15 and 15' as shown in FIGS. 3e and 3g, 3g'.

Also use of titanium oxide as the electrode reinforcing metal section 16 or reinforcing metal ring 15 is advantageous in that it can afford both the reinforcing effect for the electrodes 1 and 1' against the impulsive pressure and coloring function of the diamond particles, as above described.

Electrode constructions shown in FIGS. 3a to 3g inclusive are also effective for utilizing a catalyst to promote synthesis of diamonds particles.

By experiment, I have found that, when diamond particles are synthesized from graphite by means of spark discharge, if at least one kind of metal, such as chromium, manganese, cobalt, nickel, platinum and the like, and their oxides or chlorides are positioned near the discharge point, such metal, oxide or chloride thereof will act as a catalyst to promote the synthesis of diamond particles. For example, in the absence of a substance affording a catalytic function, spark conditions corresponding to a temperature of 3600° C. and a pressure of 200 tons per square centimeter would be necessary, thus requiring a large discharge energy, but when the catalyst is incorporated, synthesis was successfully carried out with spark conditions corresponding to a temperature between 1500° and 2000° C. and under a pressure of about 100 tons per square centimeter and with an apparatus simplified accordingly.

The means to dispose the catalyst metal adjacent the discharge point may take various forms. Thus, a construction shown in FIG. 3a wherein the catalyst metals 18 and 18' are attached to the amorphous carbon or graphite electrodes 1 and 1'; that shown in FIG. 3b wherein the catalyst metal is interposed as the intermediate electrodes 18; that shown in FIG. 3c wherein one of the electrodes 1' is made of the catalyst metal; that shown in FIG. 3d wherein the electrodes 1 and 1' are composed of laminated sections of amorphous carbon or graphite 17 and catalyst metal 16; that shown in FIG. 3e wherein the reinforcing metal rings 15 and 15' are made of the catalyst metal, that shown in FIG. 3f wherein the electrodes 1 and 1' are prepared by sintering a mixture of particles of carbon and particles of the catalyst metal; and that shown in FIG. 3g wherein the electrodes 1 and 1' comprise a plurality of laminated layers of amorphous carbon 17 and catalyst metal 16 which are clamped by reinforcing metal rings 15 and 15' or wherein the rings are made of the catalyst metal are also effective means.

FIG. 4 illustrates a modification of the apparatus for embodying the present invention. While in FIG. 1, heat and impulsive pressure due to instantaneous formation of a spark discharge are produced by a single discharge across electrodes, in FIG. 4, the electrodes are first brought to a molten state by a high temperature created by an arc discharge, and thereafter an impulsive pressure created by a spark discharge is applied to said molten portions of the electrodes whereby to effect transformation of the amorphous carbon or graphite constituting the electrodes into diamond particles.

Referring to FIG. 4, rod-shaped electrodes 1 and 1' are made of amorphous carbon or graphite and are connected with an arc source 20 via an impedance 19 for stabilizing arc discharge to maintain an arc discharge between said electrodes 1 and 1' to heat the tip thereof at an elevated temperature. Hollow cylindrical electrodes 21 and 21' are respectively arranged to surround electrodes 1 and 1' with a small gap therebetween. This small gap between said cylindrical electrodes 21 and 21' and the gap between said electrodes 1 and 1' are disposed in the same horizontal plane, but it is preferable to arrange said electrodes in such a manner that the electrodes 1 and 1' are positioned somewhat lower than the gap between the cylindrical electrodes 21 and 21' so as to cause intersection of the tip 22 of one of the electrodes 1 and 1' with the horizontal plane defined by the small gap between said cylindrical electrodes 21 and 21' in order to cause the impulsive pressure created by a spark discharge between the cylindrical electrodes 21 and 21' to act mainly in the direction perpendicular to the axes of the electrodes 21 and 21'. The cylindrical electrodes 21 and 21' are connected across the terminals of a discharge condenser 26 through lead wires 23 and 24 and a switch 25; the terminals of said condenser are connected with a source of direct current 27 through an impedance 28 for stabilizing the charging current.

The electrode assembly shown in FIG. 4 is in a sealed discharge tank 2, as shown in FIG. 1, filled with a liquid. At first an arc discharge is formed between the electrodes 1 and 1' by the electric source 20 to heat the tips of the electrodes 1 and 1' to incandescent state. The switch 25 is then closed to discharge the condenser 26 through the gap between cylindrical electrodes 21 and 21' whereby to establish a spark discharge across said cylindrical electrodes 21 and 21' at a repetition frequency determined by a time constant of said impedance 28 for stabilizing the charging current and condenser 26. Due to this repeating spark discharge between said hollow cylindrical electrodes 21 and 21', an impulsive pressure will be applied to the electrodes 1 and 1', thus supplying this pressure as a pinch force acting in all radial directions from the gap between the cylindrical electrodes, to the tips of the electrodes 1 and 1' which have been previously brought to molten state by said arc discharge, whereby it is possible to obtain the high temperature and high pressure conditions necessary for the synthesis of diamond particles.

While, in FIG. 4, the distance between the electrodes 1, 1' and the hollow cylindrical electrodes 21, 21' is shown as relatively large, actually these two pairs of electrodes are closed enough to cause transmission of the impulsive pressure created by the spark discharge between the hollow cylindrical electrodes 21 and 21' to the incandescent tips of the electrodes without any attenuation.

Although it is desirable to cause the impulsive pressure to act upon the incandescent tips of the electrodes 1 and 1' equally in all radial directions, when each of the cylindrical electrodes 21 and 21' is made as an integral unit as shown in FIG. 4, the spark discharge between them may drift laterally from time to time resulting in unequal radial pressure upon the electrodes 1 and 1', which is not effective to create a pinch force. In order to prevent spark discharge points from being formed on only one side of the hollow cylindrical electrodes 21 and 21', it is preferable to divide these cylindrical electrodes into a plurality of axially divided sections and to connect each of these sections individually to the source of impulse current. By so dividing said hollow cylindrical electrodes and by producing simultaneously independent spark discharges on said separated electrode sections, it is able to apply a uniform impulsive pressure to the incandescent portions of the electrodes 1 and 1' from all radial directions, thus enabling to increase the size of diamond particles being synthesized. Thus, in FIG. 4, if the incandescent tips 22 of the electrodes 1 and 1' are subjected to a uniform impulsive pressure in all radial directions from said surrounding hollow cylindrical electrodes, the molten carbon particles which have been formed by previous arc discharge would be dispersed in the state of larger particle size than in the case of using the apparatus shown in FIG. 1. Furthermore, it is possible to subject these dispersed molten carbon particles to a uniform impulsive high pressure supplied in all radial directions, thus enabling transformation of all the dispersed carbon particles into diamond particles.

FIG. 5 illustrates an apparatus wherein an explosive is exploded to obtain a necessary impulsive pressure to synthesize diamond particles. In this figure, similar to the apparatus disclosed in FIG. 1, a pair of electrodes 1 and 1' made of amorphous carbon or graphite is disposed in a working liquid to define a small discharge gap between them. These electrodes extend through the openings 3 and 3' provided in the side wall of the discharge tank 2 and spacers 4 and 4' are provided to hermetically seal the gap between electrodes 1 and 1' and the discharge tank 2. At the positions inside the upper and lower wall of the discharge tank 2, there are secured platforms 30 and 30' for mounting blasting caps, and on said platforms are secured blasting caps 31 and 31' serving as the explosive in positions perpendicular with respect to the discharge gap defined by said discharge electrodes 1 and 1', said blasting caps 31 and 31' being connected to terminals 33 of an ignition source not shown through ignition conductors 32, 32'. The electrodes 1 and 1' are connected to terminals 34 of a source (not shown) of impulse wave for producing an electric discharge.

When this apparatus is to be used for synthesizing diamond particles under an impulsive pressure, a spark discharge is produced across the electrodes 1 and 1' to melt a portion of amorphous carbon or graphite constituting said electrodes 1 and 1' while at the same time the blasting caps 31 and 31' are ignited to explode to impress the impulsive pressure produced thereby to said spark discharge point.

In addition, with such an apparatus, it is easy to produce an impulsive pressure of the pressure on the order of 70 to 150 tons per square centimeter, so that it is not always necessary to produce a spark discharge across said electrodes 1 and 1', but it may be possible to produce an arc discharge between them for obtaining the required high temperature while utilizing the high impulsive pressure produced by said explosion.

Figure 6:
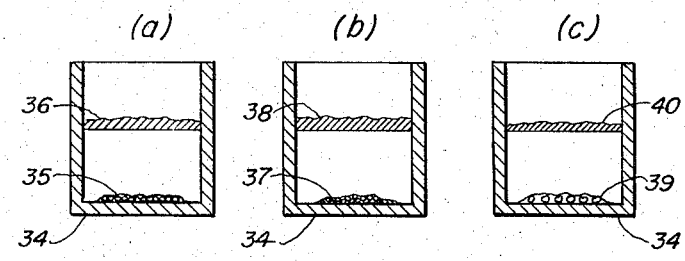

FIGS. 6a, 6b and 6c show diagrams for explaining a simple method of separating the produced diamond particles from the liquid. While there are many well known methods of separating the diamond particles from the working liquid containing them, all of such methods accompany extreme difficulties, because all of the minute particles contained in the working liquid have not been transformed into diamond particles, but the mixture contains some proportions of unconverted carbon particles together with other particles, and mere separation of minute particles from liquid is not necessarily equivalent to recovery of diamond particles. Accordingly, in the method described in FIG. 6, specific gravity is utilized wherein the minute particles are separated from the working liquid by filtration or evaporation and thereafter the separated minute particles are put in a liquid having a specific gravity of 4 contained in a vessel 34, as shown in FIG. 6a. Then, by the difference in specific gravities, particles 35 having a specific gravity higher than 4 will precipitate the bottom of the vessel 34 whereas particles 36 having a specific gravity lower than 4 and containing diamonds will float on the surface of the liquid. These particles floated on the surface of the liquid are then removed to vessel 34' containing a liquid having a specific gravity of 3.8, as shown in FIG. 6b. According to the same principle as described above, minute particles 37 having a specific gravity of from 3.8 to 4 will precipitate to the bottom of the vessel 34', whereas particles 38 having a specific gravity lower than 3.8 and containing diamonds will float on the surface of the liquid. Thereafter, when the particles floated on the surface of the liquid are thrown into a liquid having a specific gravity of 3.3 and contained in a vessel 34", as shown in FIG. 6c, the mass of particles will be separated into floating and precipitated portions. Then the particles 40 having a specific gravity lower than 3.3 and floated on the surface of the liquid are removed and minute particles 39 precipitated on the surface of the vessel 34" are collected to separate therefrom diamond particles having a specific gravity of 3.5.

Separation of diamond particles of the specific gravity of 3.5 from minute particles having a specific gravity of 3.5 to 3.8 is easier than the separation of diamond particles from the liquid, because it can be considered that nearly all of the particles having a specific gravity of 3.3 to 3.8 are diamond particles.

FIG. 7 illustrates a method of separating diamond particles by a separating method according to specific gravity in the same manner as in FIG. 6. In FIG. 7, liquids having specific gravity of 4, 3.8, and 3.3, respectively, are poured into a vessel 34. Then, due to differences in specific gravities, particles 35 having a specific gravity higher than 4 will precipitate on the bottom of the vessel 34, particles 36 and 37 having a specific gravity between 3.8 and 4 will float at the interface between the liquids having specific gravities of 3.8 and 4, respectively, particles 38 and 39 having a specific gravity between 3.3 and 3.8 will float at the interface between the liquids having specific gravities of 3.3 and 3.8, respectively, and particles 40 having a specific gravity higher than 3.3 will float on the surface of the liquid having a specific gravity higher than 3.3. Diamond particles will have to exist at the interface between liquids having specific gravities of 3.3 and 3.8, respectively, so that it can be considered that nearly all of said particles are diamond particles and can be separated as diamond particles.

The methods of separation by specific gravity as shown in FIGS. 6 and 7 are very effective for separating the diamond particles produced according to this invention. More particularly, the method illustrated in FIG. 7 was found to be most effective, because there is sufficient time for the minute particles to precipitate.

FIGS. 8a and 8b show diagrams for explaining a method of manufacturing a diamond wheel, that is, a well known grinder disc in accordance with the present invention.

Referring to FIG. 8a and 8b, at first a disc element 41 is made of graphite, or made by sintering particles of iron or nickel and particles of graphite or by adhering graphite particles to the surface of a disc made of nickel, iron, chromium and the like. The disc element 41 thus prepared is then disposed in a working liquid contained in a discharge tank, not shown, to oppose to another electrode 42, as shown in FIG. 8a, and a spark discharge is repeatedly produced on the entire surface of the disc element 41 while moving the electrode 42 or disc element 41, whereby the graphite particles 43 on the surface of the disc element 41 are converted to diamond particles 43', as shown in FIG. 8b, thus obtaining a diamond wheel. The diamond wheel produced, or the grinding disc with diamond particles on its surface can be used as a working tool or the like.

FIG. 9 is a diagram for explaining a method of producing a diamond needle for use in playing phonograph records in accordance with the method of the present invention. At first, graphite particles are adhered onto the surface of a phonograph needle 44, or the pointed tip of the needle is formed of graphite particles or of a mixture comprising graphite particles and particles of other metal. The phonograph needle 44 thus formed is then utilized as one electrode, and the other electrode 42 is disposed to oppose the pointed portion of said needle. By producing an electric discharge in a liquid contained in a discharge tank, not shown, or by utilizing electric arc together with another impulsive pressure producing means, as in the case of FIGS. 4 and 5, the pointed end of the phonograph needle 44 is transformed into diamond particles 43', thus providing a diamond needle, which is useful as a long lived needle for playing phonograph records.

Figure 8:
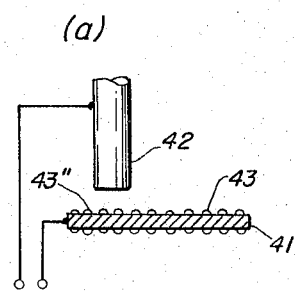

Articles shown in FIGS. 8 and 9 represent a few illustrative examples of articles which can be produced according to my method of synthesizing diamond particles and it will be obvious to those skilled in the art that many other articles can be produced according to my method of synthesis, and that this invention can be applied for the production of articles required to have high hardness.

What I claim is:

1. A method of making a diamond-faced article, comprising the steps of:
    (a) providing an electrically conductive metallic support with a carbon portion bonded to said support and exposed at a surface region thereof;
    (b) spacedly juxtaposing an electrode with at least part of said carbon portion to form a spark gap therewith;
    (c) surrounding the juxtaposed parts of said electrode and said carbon portion with an ambient liquid filling said gap; and
    (d) effecting at least one impulsive spark discharge across said gap between said carbon portion and said electrode with sufficient discharge energy to generate a temperature and pressure converting at least part of said carbon portion to diamond.

2. The method defined in claim 1 wherein said support is a wheel having said carbon portion extending over an annular zone thereof, said method further comprising the steps of successively juxtaposing said electrode spacedly with a multiplicity of regions of said zone in said liquid, and repeatedly applying a discharge electrical potential across said support and said electrode to effect intermittent and repeated spark discharges at said multiplicity of regions to form diamond throughout said zone.

3. The method defined in claim 2 wherein said support is formed by bonding graphite and metallic particles together.

4. The method defined in claim 2 wherein said support is a metal disk having a graphite layer bonded to a surface thereof.

5. The method defined in claim 1 wherein said liquid is a dielectric and said discharge energy is about 5000 joules.

6. The method defined in claim 1 wherein said support is elongated and is formed with a graphite tip at an end thereof.

7. The method defined in claim 6 wherein said graphite tip is formed by sintering graphite and metal particles together.

References Cited by the Examiner

UNITED STATES PATENTS

| | | | |
|---|---|---|---|
| 2,068,848 | 1/1937 | De Bats | 51—307 |
| 2,960,759 | 11/1960 | Bondley | 29—169.5 |
| 3,101,260 | 8/1963 | Cheney | 23—209.1 |
| 3,141,746 | 7/1964 | De Lai | 51—307 |

ALEXANDER H. BRODMERKEL, *Primary Examiner.*

D. J. ARNOLD, *Assistant Examiner.*